(12) United States Patent
Kim et al.

(10) Patent No.: US 11,261,277 B2
(45) Date of Patent: Mar. 1, 2022

(54) METHOD OF PREPARING GRAFT COPOLYMER, GRAFT COPOLYMER, AND THERMOPLASTIC RESIN MOLDED ARTICLE

(71) Applicant: LG CHEM, LTD., Seoul (KR)

(72) Inventors: Yoo Vin Kim, Daejeon (KR); Young Min Kim, Daejeon (KR); Jin Hyoung Lee, Daejeon (KR); Su Jeong Han, Daejeon (KR); Young Hwan Jeong, Daejeon (KR); Jae Min Suk, Daejeon (KR); Jae Won Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 552 days.

(21) Appl. No.: 16/339,678

(22) PCT Filed: Sep. 20, 2018

(86) PCT No.: PCT/KR2018/011104
§ 371 (c)(1),
(2) Date: Apr. 4, 2019

(87) PCT Pub. No.: WO2019/059664
PCT Pub. Date: Mar. 28, 2019

(65) Prior Publication Data
US 2019/0233568 A1   Aug. 1, 2019

(30) Foreign Application Priority Data

| Sep. 25, 2017 | (KR) | KR10-2017-0123356 |
| Sep. 25, 2017 | (KR) | KR10-2017-0123357 |
| Sep. 25, 2017 | (KR) | KR10-2017-0123358 |
| Sep. 25, 2017 | (KR) | KR10-2017-0123359 |
| Sep. 19, 2018 | (KR) | KR10-2018-0112003 |

(51) Int. Cl.
| C08F 279/04 | (2006.01) |
| C08F 2/26 | (2006.01) |
| C08F 2/24 | (2006.01) |
| C08L 55/02 | (2006.01) |
| C08K 5/098 | (2006.01) |

(52) U.S. Cl.
CPC .......... *C08F 279/04* (2013.01); *C08F 2/24* (2013.01); *C08F 2/26* (2013.01); *C08K 5/098* (2013.01); *C08L 55/02* (2013.01); *C08F 2800/20* (2013.01)

(58) Field of Classification Search
None
See application file for complete search history.

(56) References Cited

U.S. PATENT DOCUMENTS

| 5,250,611 A | 10/1993 | Baumgartner et al. |
| 5,254,622 A * | 10/1993 | Nanasawa ............. C08F 279/04 525/310 |
| 9,328,228 B2 | 5/2016 | Kashima et al. |
| 2005/0107540 A1 | 5/2005 | Koo et al. |
| 2006/0089462 A1 | 4/2006 | O et al. |
| 2009/0118393 A1 | 5/2009 | Yoo et al. |
| 2015/0246876 A1 * | 9/2015 | Ozoe ..................... C07C 303/44 526/287 |
| 2016/0017130 A1 * | 1/2016 | Yashima ................. C08F 36/18 524/710 |
| 2017/0226236 A1 | 8/2017 | Lee et al. |
| 2018/0340035 A1 | 11/2018 | Lee et al. |

FOREIGN PATENT DOCUMENTS

| JP | H06279734 A | 10/1994 |
| JP | 2790404 B2 | 8/1998 |
| JP | H10219227 A | 8/1998 |
| JP | H10251477 A | 9/1998 |
| JP | H1129618 A | 2/1999 |
| JP | 2953187 B2 | 9/1999 |
| JP | 2004536935 A | 12/2004 |
| JP | 2009191182 A | 8/2009 |
| JP | WO2013121960 A1 | 5/2015 |
| KR | 100219388 B1 | 9/1999 |
| KR | 20030020998 A | 3/2003 |
| KR | 20080034342 A | 4/2008 |
| KR | 100998379 B1 | 12/2010 |
| KR | 20130067516 A | 6/2013 |
| KR | 101457089 B1 | 10/2014 |
| KR | 101515674 B | 4/2015 |
| KR | 20160077627 A | 7/2016 |
| KR | 20160078288 A | 7/2016 |
| KR | 20170098001 A | 8/2017 |

OTHER PUBLICATIONS

International Search Report (not in English) issued in related PCT Application No. PCT/KR2018/011104 dated Dec. 28, 2018.
Search Report dated Aug. 22, 2019 for European Application No. 18855165.9.

* cited by examiner

*Primary Examiner* — Richard A Huhn

(57) ABSTRACT

Provided are a method of preparing a graft copolymer, a graft copolymer, and a thermoplastic resin molded article. The method of preparing a graft copolymer includes 1) adding a conjugated diene-based monomer and performing polymerization to prepare a conjugated diene-based polymer; and 2) adding the conjugated diene-based polymer, an aromatic vinyl monomer, and a vinyl cyan monomer and performing polymerization to prepare a graft copolymer, wherein an emulsifier having an APHA color value of 50 or less and a critical micelle concentration of 1 to 50 g/l is added, so that excellent polymerization stability, colorability, light resistance, and surface clarity are exhibited.

16 Claims, No Drawings

METHOD OF PREPARING GRAFT COPOLYMER, GRAFT COPOLYMER, AND THERMOPLASTIC RESIN MOLDED ARTICLE

CROSS-REFERENCE TO RELATED APPLICATION

This application is a U.S. National Stage of PCT/KR2018/011104, filed on Sep. 20, 2018 which claims priority to and the benefit of Korean Patent Application No. 10-2017-0123356, filed on Sep. 25, 2017, Korean Patent Application No. 10-2017-0123357, filed on Sep. 25, 2017, Korean Patent Application No. 10-2017-0123358, filed on Sep. 25, 2017, Korean Patent Application and No. 10-2017-0123359 filed on Sep. 25, 2017, and Korean Patent Application No. 10-2018-0112003, filed on Sep. 19, 2018, the disclosures of which are incorporated herein by reference in their entirety.

TECHNICAL FIELD

The present invention relates to a method of preparing a graft copolymer, a graft copolymer, and a thermoplastic resin molded article, and more particularly, to a method of preparing a graft copolymer, a graft copolymer, and a thermoplastic resin molded article, which exhibit excellent polymerization stability, colorability, light resistance, and surface clarity.

BACKGROUND ART

An acrylonitrile-butadiene-styrene (ABS) graft copolymer has been widely used in parts for an automobile, an electrical/electronic product, office equipment, etc. due to rigidity and chemical resistance of acrylonitrile and processability, mechanical strength, and refined appearance of a butadiene polymer and styrene. The surface glossiness and clarity of the ABS graft copolymer are the important factors that determine the quality of a molded article. Also, since the ABS graft copolymer is subjected to a continuous process at a high temperature (200 to 250° C.), it may be discolored during the process, and as articles produced by using the ABS graft copolymer are exposed to light several times, it may also be discolored. Therefore, a big issue is to resolve these problems in order to produce high-quality articles.

The surface glossiness and clarity of a thermoplastic resin molded article produced by using the ABS graft copolymer are affected not only by the average particle diameter and particle size distribution of a conjugated diene-based polymer but also the decomposition and degeneration of gas generated from an emulsifier in extruding and injecting processes.

Accordingly, there is ongoing research on preventing the properties of a thermoplastic resin molded article from being degraded by an emulsifier.

DISCLOSURE

Technical Problem

It is an aspect of the present invention to provide a method of preparing a graft copolymer, a graft copolymer, and a thermoplastic resin molded article, which exhibit excellent polymerization stability, colorability, light resistance, and surface clarity.

Technical Solution

According to an embodiment of the present invention, there is provided a method of preparing a graft copolymer, which includes 1) adding a conjugated diene-based monomer and performing polymerization to prepare a conjugated diene-based polymer; and 2) adding the conjugated diene-based polymer, an aromatic vinyl monomer, and a vinyl cyan monomer and performing polymerization to prepare a graft copolymer, wherein an emulsifier having an APHA color value of 50 or less and a critical micelle concentration of 1 to 50 g/l is added.

According to another embodiment of the present invention, there is provided a graft copolymer which comprises a conjugated diene-based polymer; units derived from an aromatic vinyl monomer; units derived from a vinyl cyan monomer; and an emulsifier having an APHA color value of 50 or less and a critical micelle concentration of 1 to 50 g/l.

Advantageous Effects

A method of preparing a graft copolymer according to the present invention can implement a graft copolymer and a thermoplastic resin molded article with excellent polymerization stability, colorability, light resistance, and surface clarity.

BEST MODE

Hereinafter, to help in understanding the present invention, the present invention will be described in further detail.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

In the present invention, APHA color, also referred to as the Platinum Cobalt scale or the Hazen scale, is a color standard named for the American Public Health Association and defined by ASTM D1209.

According to the scale of APHA color, a platinum-cobalt stock solution is represented as 500 on this scale of APHA color, and deionized water (D.I water) is represented as 0 on this scale of APHA color. A standard solution prepared by quantitatively diluting a platinum-cobalt stock solution is used to express color as a value subdivided into steps of 0 to 500. In this case, a diluent used to dilute a platinum-cobalt stock solution is D.I water.

Since APHA color is related to, particularly, yellowness index, the APHA color value of a measured sample can be obtained using the APHA color standard curve of a standard solution with respect to yellowness. This method is applied to measure the chromaticities of a clear liquid and solid tinged with color (commonly expressed as "brownish yellow") similar to a platinum-cobalt stock solution.

In the present invention, a critical micelle concentration may be obtained by measuring surface tension while an emulsifier is added to distilled water and measuring the concentration when surface tension is kept constant. A critical micelle concentration may be measured using Attention® SIGMA 701 (Model Name; manufactured by Biolin Scientific).

In the present invention, a polymerization conversion rate represents a ratio of the solid content of an obtained polymer to the total content of monomer or monomer and polymer, which are prescriptively added until a polymerization conversion rate reaches each point, and may be calculated by the following formula.

Polymerization conversion rate (%) of conjugated
diene-based polymer={(Solid content of actually obtained conjugated diene-based polymer)/
(Total content of prescriptively added monomer)}×100

Polymerization conversion rate (%) of graft copolymer={(Solid content of actually obtained graft
copolymer)/(Total content of prescriptively
added monomer and conjugated diene-based
polymer)}×100

In the present invention, the average particle diameters of a conjugated diene-based polymer and a graft copolymer may be measured by dynamic light scattering, and specifically, may be measured using a scattering analyzer (the trade name "Nicomp 370 HPL" manufactured by Nicomp).

In the specification, an average particle diameter may refer to an arithmetic average particle diameter in the particle size distribution as measured by dynamic light scattering. The arithmetic average particle diameter may be measured as an average particle in a scattering intensity distribution, a volume distribution, or a number distribution, and is preferably measured in a scattering intensity distribution.

1. Method of Preparing Graft Copolymer

A method of preparing a graft copolymer according to one embodiment of the present invention includes 1) adding a conjugated diene-based monomer and performing polymerization to prepare a conjugated diene-based polymer; and 2) adding the conjugated diene-based polymer, an aromatic vinyl monomer, and a vinyl cyan monomer and performing polymerization to prepare a graft copolymer, wherein an emulsifier having an APHA color value of 50 or less and a critical micelle concentration of 1 to 50 g/l is added.

The emulsifier may have an APHA color value of 40 or less and a critical micelle concentration of 1 to 40 g/l or an APHA color value of 35 or less and a critical micelle concentration of 1 to 35 g/1. An emulsifier having an APHA color value of 35 or less and a critical micelle concentration and 1 to 35 g/1 is preferred.

When the emulsifier satisfies the above-described conditions, discoloration of a graft copolymer to yellow due to the emulsifier may be minimized, and thus a graft copolymer with remarkably improved colorability may be implemented. Also, the graft copolymer may exhibit remarkably improved light resistance and surface clarity.

When the APHA color value of the emulsifier is above this range, yellowness of a graft copolymer is increased due to the emulsifier, and thus a graft copolymer exhibits not only degraded colorability but also degraded clarity and light resistance.

When the critical micelle concentration of the emulsifier is below the above range, the number of base particles, specifically, base particles of the conjugated diene-based polymer latex and/or base particles of the graft copolymer latex is increased in a polymerization process, and thus a conjugated diene-based polymer having a desired average particle diameter is not easily prepared. To solve this problem, an addition amount of an electrolyte needs to be increased, which causes the thermal stability of a conjugated diene-based polymer and/or a graft copolymer to be degraded. Also, when an addition amount of an electrolyte is not increased, stability and polymerization stability of latex are degraded, and the heat and rate of reaction are not easily adjusted.

When the critical micelle concentration of the emulsifier is above this range, a micelle is not easily formed, and thus a reaction rate is lowered, and emulsifying capability is degraded, thereby reducing polymerization stability.

The emulsifier having an APHA color value of 50 or less and a critical micelle concentration of 1 to 50 g/l may be added in one or more of step 1) and step 2). It is preferable to add the emulsifier in both step 1) and step 2) in order to minimize discoloration of a graft copolymer to yellow due to the emulsifier.

Meanwhile, the emulsifier may be an alkali metal rosinate having an APHA color value of 50 or less, and potassium rosinate having an APHA color value of 50 or less is preferred.

Potassium rosinate having an APHA color value of 50 or less may be high-purity potassium rosinate including a remarkably small amount of impurities, specifically, longicyclene, eremophilene, and longifolene.

Hereinafter, step 1) and step 2) included in the method of preparing a graft copolymer according to one embodiment of the present invention will be described in detail.

Step 1)

First, a conjugated diene-based monomer is added and polymerized to prepare a conjugated diene-based polymer. The conjugated diene-based monomer may be one or more selected from the group consisting of 1,3-butadiene, isoprene, chloroprene, and piperylene. Among these, 1,3-butadiene is preferred.

The conjugated diene-based monomer may be added partially before the initiation of polymerization and when a polymerization conversion rate is in an interval of 30 to 40%. When compared with a case in which the conjugated diene-based monomer is added at one time before the initiation of polymerization, this case enables released heat to be easily controlled and vaporization of the conjugated diene-based monomer to be prevented as much as possible, and thus loss of the added conjugated diene-based monomer may be minimized.

The polymerization may be performed at 60 to 85° C. or 65 to 80° C., and is preferably performed at 65 to 80° C.

When a temperature of the polymerization falls within the above range, a polymerization rate may be appropriately adjusted, and thus released heat is easily controlled, and an amount of gel contained in the conjugated diene-based polymer may also be easily adjusted.

The conjugated diene-based polymer may have an average particle diameter of 50 to 500 nm, 50 to 200 nm, 50 to 170 nm, 70 to 130 nm, 90 to 120 nm, 250 to 500 nm, 250 to 450 nm, or 250 to 350 nm, and preferably has an average particle diameter of 90 to 120 nm or 250 to 350 nm.

When an average particle diameter of the conjugated diene-based polymer falls within the above range, a graft copolymer with excellent impact resistance and surface glossiness may be prepared.

In addition, when the conjugated diene-based polymer has an average particle diameter of 50 to 200 nm, 50 to 170 nm, 70 to 130 nm, or 90 to 120 nm, surface glossiness may be further improved. Additionally, when the conjugated diene-based polymer has an average particle diameter of 250 to 500 nm, 250 to 450 nm, or 250 to 350 nm, impact resistance may be further improved.

In step 1), one or more selected from the group consisting of an emulsifier, an initiator, a redox-based catalyst, an electrolyte, a molecular weight controlling agent, and water may be further added.

The emulsifier may be an emulsifier having an APHA color value of 50 or less and a critical micelle concentration of 1 to 50 g/l.

In step 1), to further improve colorability, light resistance, and surface clarity of a graft copolymer, an emulsifier having an APHA color value of 50 or less and a critical micelle concentration of 1 to 50 g/l is preferably added as the emulsifier.

The emulsifier having an APHA color value of 50 or less and a critical micelle concentration of 1 to 50 g/l may be added in an amount of 0.1 to 5 parts by weight, 0.3 to 4 parts by weight, or 0.5 to 3 parts by weight with respect to 100 parts by weight of the conjugated diene-based monomer.

When an addition amount of the emulsifier falls within the above range, polymerization stability of the conjugated diene-based polymer may be significantly improved, and colorability, thermal stability, light resistance, and surface clarity of the graft copolymer may be significantly improved. Also, a conjugated diene-based polymer having a desired average particle diameter may be prepared.

The emulsifier having an APHA color value of 50 or less and a critical micelle concentration of 1 to 50 g/l may be added at one time before the initiation of polymerization or may be added partially after the initiation of polymerization.

The emulsifier having an APHA color value of 50 or less and a critical micelle concentration of 1 to 50 g/l is preferably added before the initiation of polymerization for ease of a process, and also preferably added partially after the initiation of polymerization for further improving surface glossiness, thermal stability, light resistance, and surface clarity.

In the case of separate addition of the emulsifier having an APHA color value of 50 or less and a critical micelle concentration of 1 to 50 g/l, the emulsifier may be added partially when a polymerization conversion rate is in intervals of 30 to 40% and 60 to 70%; when a polymerization conversion rate is in intervals of 30 to 40%, 45 to 55%, and 60 to 70%; or before the initiation of polymerization and when a polymerization conversion rate is in intervals of 30 to 40%, 45 to 55%, and 60 to 70%.

When the emulsifier having an APHA color value of 50 or less and a critical micelle concentration of 1 to 50 g/l is added partially when a polymerization conversion rate is in intervals of 30 to 40% and 60 to 70%, emulsifier degeneration caused by heat of polymerization may be minimized, and polymerization stability may be further improved.

In the case of separate addition at these points, the emulsifier may be added partially in a weight ratio of 50:50 to 10:90 or 50:50 to 20:80, and is preferably added partially in a weight ratio of 50:50 to 20:80.

When a weight ratio in which the emulsifier is added partially falls within the above range, emulsifier degeneration caused by heat of polymerization may be minimized, and polymerization stability may be further improved.

When the emulsifier having an APHA color value of 50 or less and a critical micelle concentration of 1 to 50 g/l is added partially when a polymerization conversion rate is in intervals of 30 to 40%, 45 to 55%, and 60 to 70%, emulsifier degeneration caused by heat of polymerization may be minimized, and polymerization stability may be further improved.

In the case of separate addition at these points, the emulsifier having an APHA color value of 50 or less and a critical micelle concentration of 1 to 50 g/l may be added in an amount of 25 to 45 wt % when a polymerization conversion rate is in an interval of 30 to 40%, 25 to 45 wt % when a polymerization conversion rate is in an interval of 45 to 55%, and 25 to 45 wt % when a polymerization conversion rate is in an interval of 60 to 70% with respect to the total weight of the emulsifier added in step 1). The emulsifier is preferably added in an amount of 30 to 40 wt % when a polymerization conversion rate is in an interval of 30 to 40%, 30 to 40 wt % when a polymerization conversion rate is in an interval of 45 to 55%, and 30 to 40 wt % when a polymerization conversion rate is in an interval of 60 to 70%.

When an amount of the emulsifier added at each point falls within the above range, emulsifier degeneration caused by heat of polymerization may be minimized, and polymerization stability may be further improved.

When the emulsifier having an APHA color value of 50 or less and a critical micelle concentration of 1 to 50 g/l is added partially before the initiation of polymerization and when a polymerization conversion rate is in intervals of 30 to 40%, 45 to 55%, and 60 to 70%, emulsifier degeneration caused by heat of polymerization may be minimized, and polymerization stability may be further improved.

In the case of separate addition at the above points, the emulsifier having an APHA color value of 50 or less and a critical micelle concentration of 1 to 50 g/l may be added in an amount of 50 to 70 wt % before the initiation of polymerization, 1 to 20 wt % when a polymerization conversion rate is in an interval of 30 to 40%, 1 to 20 wt % when a polymerization conversion rate is in an interval of 45 to 55%, and 1 to 20 wt % when a polymerization conversion rate is in an interval of 60 to 70% with respect to the total weight of the emulsifier added in step 1). The emulsifier is preferably added in an amount of 55 to 65 wt % before the initiation of polymerization, 5 to 15 wt % when a polymerization conversion rate is in an interval of 30 to 40%, 5 to 15 wt % when a polymerization conversion rate is in an interval of 45 to 55%, and 5 to 15 wt % when a polymerization conversion rate is in an interval of 60 to 70%.

When an amount of the emulsifier added at each point falls within the above range, emulsifier degeneration caused by heat of polymerization may be minimized, and polymerization stability may be further improved.

The initiator may be one or more selected from the group consisting of potassium persulfate, sodium persulfate, ammonium persulfate, cumene hydroperoxide, diisopropyl benzene hydroperoxide, azobisisobutyronitrile, t-butyl hydroperoxide, paramethane hydroperoxide, and benzoyl peroxide. Among these, potassium persulfate is preferred.

The initiator is preferably added partially before the initiation of polymerization and when a polymerization conversion rate is in an interval of 30 to 40%. This case enables a polymerization rate to be maintained better than a case in which the initiator is added at one time before the initiation of polymerization.

The redox-based catalyst may be one or more selected from the group consisting of sodium formaldehyde sulfoxylate, sodium ethylenediaminetetraacetate, ferrous sulfate, dextrose, sodium pyrophosphate, anhydrous sodium pyrophosphate, and sodium sulfate. Among these, one or more selected from the group consisting of ferrous sulfate, dextrose, and sodium pyrophosphate are preferred.

The electrolyte may be one or more selected from the group consisting of KCl, NaCl, KOH, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, and $Na_2HPO_4$. Among these, one or more selected from the group consisting of KOH and $K_2CO_3$ are preferred.

The molecular weight controlling agent may be one or more selected from the group consisting of an α-methylstyrene dimer, t-dodecylmercaptan, n-dodecylmercaptan, octyl mercaptan, carbon tetrachloride, methylene chloride, methylene bromide, tetraethylthiuram disulfide, dipentamethylenethiuram disulfide, and diisopropylxanthogen disulfide. Among these, t-dodecylmercaptan is preferred.

The water may be ion exchanged water.

Step 2)

Subsequently, the conjugated diene-based polymer, an aromatic vinyl monomer, and a vinyl cyan monomer are added and polymerized to prepare a graft copolymer.

The conjugated diene-based polymer may be added in an amount of 20 to 70 wt % or 25 to 65 wt % with respect to the total weight of the conjugated diene-based polymer, the aromatic vinyl monomer, and the vinyl cyan monomer, and is preferably added in an amount of 25 to 65 wt %.

When an addition amount of the conjugated diene-based polymer falls within the above range, a graft copolymer with excellent balance among mechanical properties, heat resistance, chemical resistance, and processability may be prepared.

The aromatic vinyl monomer may be one or more selected from the group consisting of styrene, α-methylstyrene, α-ethylstyrene, and p-methylstyrene. Among these, styrene is preferred.

The vinyl cyan monomer may be one or more selected from the group consisting of acrylonitrile, methacrylonitrile, phenyl acrylonitrile, and α-chloroacrylonitrile. Among these, acrylonitrile is preferred.

The total amount of the aromatic vinyl monomer and the vinyl cyan monomer may be 30 to 80 wt % or 35 to 75 wt % with respect to the total weight of the conjugated diene-based polymer, the aromatic vinyl monomer, and the vinyl cyan monomer, and is preferably 35 to 75 wt %.

In this case, the aromatic vinyl monomer and the vinyl cyan monomer may be added in a weight ratio of 1:1 to 5:1, 1.5:1 to 4:1, or 2:1 to 4:1, and are preferably added in a weight ratio of 2:1 to 4:1.

When a weight ratio of the aromatic vinyl monomer and the vinyl cyan monomer falls within the above range, a graft copolymer with excellent balance among mechanical properties, heat resistance, chemical resistance, and processability may be prepared.

The polymerization may be performed at 60 to 90° C. or 65 to 85° C., and is preferably performed at 65 to 85° C.

When a temperature of the polymerization falls within the above range, a polymerization rate may be appropriately maintained.

The graft copolymer may have an average particle diameter of 100 to 550 nm, 100 to 200 nm, 120 to 180 nm, 140 to 170 nm, 300 to 550 nm, 300 to 500 nm, or 300 to 400 nm, and the graft copolymer having an average particle diameter of 140 to 170 nm or 300 to 400 nm is preferred.

When an average particle diameter of the graft copolymer falls within the above range, a graft copolymer with excellent impact resistance and surface glossiness may be prepared.

In addition, when the graft copolymer has an average particle diameter of 100 to 200 nm, 120 to 180 nm, or 140 to 170 nm, surface glossiness may be further improved. Additionally, when the graft copolymer has an average particle diameter of 300 to 550 nm, 300 to 500 nm, or 300 to 400 nm, impact resistance may be further improved.

The polymerization may be performed in the presence of one or more selected from the group consisting of an emulsifier, an initiator, a redox-based catalyst, a molecular weight controlling agent, and water.

The emulsifier may be one or more selected from the group consisting of an emulsifier having an APHA color value of 50 or less and a critical micelle concentration of 1 to 50 g/l and an emulsifier having a critical micelle concentration of less than 1 g/l.

In step 2), the emulsifier having an APHA color value of 50 or less and a critical micelle concentration of 1 to 50 g/l and the emulsifier having a critical micelle concentration of less than 1 g/l may be added alone or in combination thereof.

The emulsifier having an APHA color value of 50 or less and a critical micelle concentration of 1 to 50 g/l may be added in an amount of 0.01 to 2.5 parts by weight, 0.05 to 2 parts by weight, or 0.1 to 1.5 parts by weight with respect to 100 parts by weight of a combined amount of the conjugated diene-based polymer, the aromatic vinyl monomer, and the vinyl cyan monomer, and is preferably added in an amount of 0.1 to 1.5 parts by weight.

When an addition amount of the emulsifier falls within the above range, residence discoloration, light discoloration, and surface clarity may be improved.

The emulsifier having a critical micelle concentration of less than 1 g/l may be fatty acid soap which may have a critical micelle concentration of 0.3 g/l or less.

The emulsifier having an APHA color value of 50 or less and a critical micelle concentration of 1 to 50 g/l may be added before or after the initiation of polymerization. The emulsifier is preferably added before the initiation of polymerization for ease of a process, and also preferably added partially after the initiation of polymerization for further improving polymerization stability, latex stability, surface glossiness, thermal stability, light resistance, and surface clarity.

Examples of the initiator are the same as described above. Among these, one or more selected from the group consisting of t-butyl hydroperoxide and cumene hydroperoxide are preferred.

The initiator is preferably added partially before the initiation of polymerization and when a polymerization conversion rate is in an interval of 80 to 90%. In this case, an increase in polymerization conversion rate may be facilitated compared to a case in which the initiator is added at one time before the initiation of polymerization.

Examples of the redox-based catalyst are the same as described above. Among these, one or more selected from the group consisting of ferrous sulfate, dextrose, and sodium pyrophosphate are preferred.

Examples of the molecular weight controlling agent are the same as described above. Among these, t-dodecylmercaptan is preferred.

The water may be ion exchanged water.

2. Graft Copolymer

A graft copolymer according to another embodiment of the present invention includes a conjugated diene-based polymer; units derived from an aromatic vinyl monomer; units derived from a vinyl cyan monomer; and an emulsifier having an APHA color value of 50 or less and a critical micelle concentration of 1 to 50 g/l.

The emulsifier having an APHA color value of 50 or less and a critical micelle concentration of 1 to 50 g/l may be a residue of the emulsifier added in the preparation process of a graft copolymer.

In addition, the descriptions of the graft copolymer are the same as described in "1. Method of preparing graft copolymer", and the graft copolymer according to another embodiment of the present invention may be prepared by the method of preparing a graft copolymer according to one embodiment of the present invention.

3. Thermoplastic Resin Composition

A thermoplastic resin composition according to still another embodiment of the present invention includes the graft copolymer according to another embodiment of the present invention; and a matrix copolymer including units derived from an aromatic vinyl monomer and units derived from a vinyl cyan monomer.

The matrix copolymer may include the units derived from the aromatic vinyl monomer and the units derived from the vinyl cyan monomer in a weight ratio of 60:40 to 80:20 or 65:35 to 75:25. The matrix copolymer including the units derived from the aromatic vinyl monomer and the units derived from the vinyl cyan monomer in a weight ratio of 65:35 to 75:25 is preferred.

When a weight ratio of the units derived from the aromatic vinyl monomer and the units derived from the vinyl cyan monomer included in the matrix copolymer falls within the above range, a thermoplastic resin composition excellent in all of heat resistance, fluidity, and chemical resistance may be prepared.

The thermoplastic resin composition may include the graft copolymer and the matrix copolymer in a weight ratio of 15:85 to 40:60 or 20:80 to 35:65. The thermoplastic resin composition including the graft copolymer and the matrix copolymer in a weight ratio of 20:80 to 35:65 is preferred.

When a weight ratio of the graft copolymer and the matrix copolymer included in the thermoplastic resin composition falls within the above range, a thermoplastic resin composition with excellent colorability, heat resistance, fluidity, chemical resistance, thermal stability, and appearance may be prepared.

The thermoplastic resin composition may further include an additive such as a dye, a pigment, a lubricant, an antioxidant, an UV stabilizer, a heat stabilizer, a reinforcing agent, a filler, a flame retardant, a foaming agent, a plasticizer, a matting agent, etc. depending on the area of application.

MODE FOR INVENTION

Hereinafter, the present invention will be described in detail with reference to embodiments so that those skilled in the art can easily carry out the present invention. However, the present invention may be implemented in several different forms, and therefore, is not limited to embodiments described herein.

Example 1

<Preparation of Conjugated Diene-Based Polymer>

75 parts by weight of 1,3-butadiene, 1.0 part by weight of potassium rosinate A (the trade name "potassium rosinate" manufactured by Seongsan INC; APHA color value: 30, critical micelle concentration: 25 g/l) and 0.8 part by weight of fatty acid soap (C8-C20 fatty soap, sodium or potassium salts of fatty acids; APHA color value: 80, critical micelle concentration: 0.14 g/l) as emulsifiers, 1.5 parts by weight of $K_2CO_3$ as an electrolyte, 0.3 part by weight of t-dodecylmercaptan as a molecular weight controlling agent, 0.3 part by weight of potassium persulfate as an initiator, and 60 parts by weight of ion exchanged water were added at one time into a nitrogen-substituted polymerization reactor. The temperature inside the reactor was raised to 70° C., and polymerization was then initiated.

When a polymerization conversion rate reached about 35%, 25 parts by weight of 1,3-butadiene and 0.15 part by weight of potassium persulfate were added at one time, and polymerization was continuously performed.

When a polymerization conversion rate reached about 60%, the temperature was raised to 80° C., and when a polymerization conversion rate reached 93%, the polymerization was terminated. As a result, a conjugated diene-based polymer latex was prepared.

<Preparation of Graft Copolymer>

60 parts by weight (based on solid content) of the conjugated diene-based polymer latex, 30 parts by weight of styrene, 10 parts by weight of acrylonitrile, 0.3 part by weight of fatty acid soap (C8-C20 fatty soap, sodium or potassium salts of fatty acids; APHA color value: 80, critical micelle concentration: 0.14 g/l) as an emulsifier, 0.4 part by weight of t-dodecylmercaptan as a molecular weight controlling agent, 0.07 part by weight of t-butyl hydroperoxide as an initiator, 0.054 part by weight of dextrose, 0.004 part by weight of sodium pyrophosphate, and 0.002 part by weight of ferrous sulfate, and 55 parts by weight of ion exchanged water were mixed at 50° C. and added at one time into a reactor. The temperature inside the reactor was raised to 70° C., and polymerization was then initiated.

When a polymerization conversion rate reached about 85%, 0.23 part by weight of cumene hydroperoxide as an initiator was added at one time, and polymerization was performed while the temperature was raised to 80° C. and an aging process was then performed. When a polymerization conversion rate reached 97%, the polymerization was terminated. As a result, a graft copolymer latex was prepared.

The graft copolymer latex was coagulated using an aqueous 10 wt % sulfate solution, and the resultant graft copolymer latex was aged, washed, dehydrated, and dried to obtain a graft copolymer in the form of a powder.

Example 2

<Preparation of Conjugated Diene-Based Polymer>

A conjugated diene-based polymer was prepared in the same manner as in Example 1 except that 0.2 part by weight of potassium rosinate A was further added when a polymerization conversion rate reached about 35%, about 50%, and about 65% respectively.

<Preparation of Graft Copolymer>

A graft copolymer in the form of a powder was prepared in the same manner as in Example 1.

Example 3

<Preparation of Conjugated Diene-Based Polymer>

A conjugated diene-based polymer was prepared in the same manner as in Example 1 except that potassium rosinate B (the trade name "potassium rosinate" manufactured by Lanton KOREA; APHA color value: 450 or more, critical micelle concentration: 25 g/l) was added instead of potassium rosinate A before the initiation of polymerization.

<Preparation of Graft Copolymer>

A graft copolymer was prepared in the same manner as in Example 1 except that 0.2 part by weight of potassium rosinate A was further added when a polymerization conversion rate reached about 40%.

Example 4

<Preparation of Conjugated Diene-Based Polymer>

A conjugated diene-based polymer was prepared in the same manner as in Example 3.

<Preparation of Graft Copolymer>

A graft copolymer was prepared in the same manner as in Example 1 except that 0.5 part by weight of potassium rosinate A was added instead of 0.3 part by weight of fatty acid soap (C8-C20 fatty soap, sodium or potassium salts of fatty acids; APHA color value: 80, critical micelle concentration: 0.14 g/l) before the initiation of polymerization.

Example 5

<Preparation of Conjugated Diene-Based Polymer>

A conjugated diene-based polymer was prepared in the same manner as in Example 2 except that 1.1 parts by weight of fatty acid soap (C8-C20 fatty soap, sodium or potassium salts of fatty acids; APHA color value: 80, critical micelle concentration: 0.14 g/l) was added and 1.0 part by weight of potassium rosinate A was not added before the initiation of polymerization.

<Preparation of Graft Copolymer>

A graft copolymer was prepared in the same manner as in Example 1 except that polymerization was initiated after the temperature inside the reactor was raised to 76° C., and 0.2 part by weight of potassium rosinate A was further added when a polymerization conversion rate reached 40%.

Example 6

<Preparation of Conjugated Diene-Based Polymer>

A conjugated diene-based polymer was prepared in the same manner as in Example 5.

<Preparation of Graft Copolymer>

A graft copolymer was prepared in the same manner as in Example 1 except that 0.5 part by weight of potassium rosinate A was added instead of 0.3 part by weight of fatty acid soap before the initiation of polymerization, and polymerization was initiated after the temperature inside the reactor was raised to 76° C.

Example 7

<Preparation of Conjugated Diene-Based Polymer>

A conjugated diene-based polymer was prepared in the same manner as in Example 1.

<Preparation of Graft Copolymer>

A conjugated diene-based polymer was prepared in the same manner as in Example 5.

Example 8

<Preparation of Conjugated Diene-Based Polymer>

90 parts by weight of 1,3-butadiene, 1.5 parts by weight of fatty acid soap (C8-C20 fatty soap, sodium or potassium salts of fatty acids; APHA color value: 80, critical micelle concentration: 0.14 g/l) as an emulsifier, 0.1 part by weight of $K_2CO_3$ as an electrolyte, 0.1 part by weight of t-dodecyl-mercaptan as a molecular weight controlling agent, 0.15 part by weight of t-butyl hydroperoxide as an initiator, 0.06 part by weight of dextrose as a redox-based catalyst, 0.005 part by weight of sodium pyrophosphate, 0.0025 part by weight of ferrous sulfate, and 75 parts by weight of ion exchanged water were added at one time into a nitrogen-substituted polymerization reactor. The temperature inside the reactor was raised to 55° C., and polymerization was then initiated.

When a polymerization conversion rate reached about 35%, 0.75 part by weight of potassium rosinate A as an emulsifier and 0.3 part by weight of potassium persulfate as an initiator were added at one time, and polymerization was continuously performed while the temperature was raised to 72° C.

When a polymerization conversion rate reached about 65%, 0.75 part by weight of potassium rosinate A and 10 parts by weight of 1,3-butadiene were added at one time, and when a polymerization conversion rate reached 95%, the polymerization was terminated. As a result, a conjugated diene-based polymer latex was prepared.

<Preparation of Graft Copolymer>

A conjugated diene-based polymer was prepared in the same manner as in Example 6.

Example 9

<Preparation of Conjugated Diene-Based Polymer>

A conjugated diene-based polymer was prepared in the same manner as in Example 8 except that 1.5 parts by weight of potassium rosinate A was further added before the initiation of polymerization, and potassium rosinate A was not added when a polymerization conversion rate reached 35% and 65%.

<Preparation of Graft Copolymer>

A graft copolymer was prepared in the same manner as in Example 6.

Example 10

Potassium rosinate C (APHA color value: 50, critical micelle concentration: 25 g/l) was prepared by mixing potassium rosinate A and potassium rosinate B in a weight ratio of 15:1.

<Preparation of Conjugated Diene-Based Polymer>

A conjugated diene-based polymer was prepared in the same manner as in Example 8 except that potassium rosinate C was added instead of potassium rosinate A.

<Preparation of Graft Copolymer>

A graft copolymer was prepared in the same manner as in Example 8 except that potassium rosinate C was added instead of potassium rosinate A.

Comparative Example 1

<Preparation of Conjugated Diene-Based Polymer>

A graft copolymer was prepared in the same manner as in Example 3.

<Preparation of Graft Copolymer>

A conjugated diene-based polymer was prepared in the same manner as in Example 3 except that potassium rosinate B was added instead of potassium rosinate A.

Comparative Example 2

<Preparation of Conjugated Diene-Based Polymer>

A conjugated diene-based polymer was prepared in the same manner as in Example 2 except that potassium rosinate B was added instead of potassium rosinate A.

<Preparation of Graft Copolymer>

A graft copolymer was prepared in the same manner as in Example 1.

Comparative Example 3

<Preparation of Conjugated Diene-Based Polymer>

A conjugated diene-based polymer was prepared in the same manner as in Example 3.

<Preparation of Graft Copolymer>

A graft copolymer was prepared in the same manner as in Comparative Example 3 except that potassium rosinate B was added before the initiation of polymerization.

Comparative Example 4

<Preparation of Conjugated Diene-Based Polymer>

A conjugated diene-based polymer was prepared in the same manner as in Example 9 except that potassium rosinate B was added instead of potassium rosinate A.

<Preparation of Graft Copolymer>

A conjugated diene-based polymer was prepared in the same manner as in Example 9 except that potassium rosinate B was added instead of potassium rosinate A.

Comparative Example 5

Potassium rosinate D (APHA color value: 65, critical micelle concentration: 25 g/l) was prepared by mixing potassium rosinate A and potassium rosinate B in a weight ratio of 10:1.

<Preparation of Conjugated Diene-Based Polymer>

A conjugated diene-based polymer was prepared in the same manner as in Example 8 except that potassium rosinate D was added instead of potassium rosinate A.

<Preparation of Graft Copolymer>

A graft copolymer was prepared in the same manner as in Example 8.

The type, addition amount, and adding point of the emulsifier used in each of Examples and Comparative Examples were summarized and shown in the following Table 1.

TABLE 1

| Classification | Emulsifier (parts by weight) | Preparation of conjugated diene-based polymer Polymerization conversion rate (%) | | | | Preparation of graft copolymer Polymerization conversion rate (%) | |
|---|---|---|---|---|---|---|---|
| | | 0 | 35 | 50 | 65 | 0 | 40 |
| Example 1 | Potassium rosinate A | 1 | — | — | — | — | — |
| | Fatty acid soap | 0.8 | — | — | — | 0.3 | — |
| Example 2 | Potassium rosinate A | 1 | 0.2 | 0.2 | 0.2 | — | — |
| | Fatty acid soap | 0.8 | — | — | — | 0.3 | — |
| Example 3 | Potassium rosinate A | — | — | — | — | — | 0.2 |
| | Potassium rosinate B | 1 | — | — | — | — | — |
| | Fatty acid soap | 0.8 | — | — | — | 0.3 | — |
| Example 4 | Potassium rosinate A | — | — | — | — | 0.5 | — |
| | Potassium rosinate B | 1 | — | — | — | — | — |
| | Fatty acid soap | 0.8 | — | — | — | — | — |
| Example 5 | Potassium rosinate A | — | 0.2 | 0.2 | 0.2 | — | 0.2 |
| | Fatty acid soap | 1.1 | — | — | — | 0.3 | — |
| Example 6 | Potassium rosinate A | — | 0.2 | 0.2 | 0.2 | 0.5 | — |
| | Fatty acid soap | 1.1 | — | — | — | — | — |
| Example 7 | Potassium rosinate A | 1 | — | — | — | — | 0.2 |
| | Fatty acid soap | 0.8 | — | — | — | 0.3 | — |
| Example 8 | Potassium rosinate A | — | 0.75 | — | 0.75 | 0.5 | — |
| | Fatty acid soap | 1.5 | — | — | — | — | — |
| Example 9 | Potassium rosinate A | 1.5 | — | — | — | 0.5 | — |
| | Fatty acid soap | 1.5 | — | — | — | — | — |
| Example 10 | Potassium rosinate C | — | 0.75 | — | 0.75 | 0.5 | — |
| | Fatty acid soap | 1.5 | — | — | — | — | — |
| Comparative Example 1 | Potassium rosinate B | 1 | — | — | — | — | 0.2 |
| | Fatty acid soap | 0.8 | — | — | — | 0.3 | — |
| Comparative Example 2 | Potassium rosinate B | 1 | 0.2 | 0.2 | 0.2 | — | — |
| | Fatty acid soap | 0.8 | — | — | — | 0.3 | — |
| Comparative Example 3 | Potassium rosinate B | 1 | — | — | — | 0.2 | — |
| | Fatty acid soap | 0.8 | — | — | — | 0.3 | — |
| Comparative Example 4 | Potassium rosinate B | 1.5 | — | — | — | 0.5 | — |
| | Fatty acid soap | 1.5 | — | — | — | — | — |

TABLE 1-continued

| | | Preparation of conjugated diene-based polymer Polymerization conversion rate (%) | | | | Preparation of graft copolymer Polymerization conversion rate (%) | |
|---|---|---|---|---|---|---|---|
| Classification | Emulsifier (parts by weight) | 0 | 35 | 50 | 65 | 0 | 40 |
| Comparative Example 5 | Potassium rosinate C | — | — | — | — | 0.5 | — |
| | Potassium rosinate D | — | 0.75 | — | 0.75 | — | — |
| | Fatty acid soap | 1.5 | — | — | — | — | — |

Potassium rosinate A: the trade name "potassium rosinate" manufactured by Seongsan INC; APHA color value: 30, critical micelle concentration: 25 g/l Potassium rosinate B: the trade name "potassium rosinate" manufactured by: Lanton Korea; APHA color value: 450 or more, critical micelle concentration: 25 g/l Potassium rosinate C (APHA color value: 50, critical micelle concentration: 25 g/l): prepared by mixing potassium rosinate A and potassium rosinate B in a weight ratio of 15:1.

Potassium rosinate D (APHA color value: 65, critical micelle concentration: 25 g/l): prepared by mixing potassium rosinate A and potassium rosinate B in a weight ratio of 10:1

Fatty acid soap: C8-C20 fatty soap, sodium or potassium salts of fatty acids; APHA color value: 80, critical micelle concentration: 0.14 g/l Experimental Example 1

The properties of the conjugated diene-based polymers and the graft copolymers according to Examples and Comparative Examples were measured by the following methods, and results thereof are shown in the following Table 2.

① Average particle diameter (μm): measured by dynamic light scattering using a scattering analyzer (the trade name "Nicomp 370 HPL" manufactured by Nicomp)

② Latex stability (%) of conjugated diene-based polymer: 500 g of a conjugated diene-based polymer latex was filtered using a 100 mesh net, and the filtrate was introduced into a homomixer (the trade name "T.K.ROBOMICS" manufactured by: T.K. Primix) and then kept at 10,000 rpm for 60 minutes. Afterward, a coagulated material on a 100 mesh net was measured, and latex stability was calculated by the following formula.

Latex stability (%)={(Weight of coagulated material on 100 mesh net)/(Theoretical total weight of added monomer and additive)}×100

③ Solid coagulation content (%): the conjugated diene-based polymer latex or the graft copolymer latex was filtered using a 100 mesh net, a conjugated diene-based polymer latex that did not pass through the net was then dried with a 100° C. hot-air dryer for 1 hour, and a solid coagulation content was calculated by the following formula.

Solid coagulation content (%)={(Weight of conjugated diene-based polymer latex dried by hot air)/(Theoretical total weight of added monomer and additive)}×100

Additives: an emulsifier, an initiator, an electrolyte, a molecular weight controlling agent ④ Latex stability of graft copolymer: a graft copolymer latex was introduced into a homomixer (the trade name "T.K.ROBOMICS" manufactured by: T.K. Primix), and the time required to coagulate the graft copolymer latex at 15,000 rpm was then measured. A case in which it took 60 minutes or more for the graft copolymer latex to be coagulated was considered as excellent latex stability.

TABLE 2

| | Conjugated diene-based polymer | | | | Graft copolymer | | | |
|---|---|---|---|---|---|---|---|---|
| Classification | Addition of potassium rosinate A or C | Average particle diameter (nm) | Latex stability (wt %) | Solid coagulation content (wt %) | Addition of potassium rosinate A or C | Average particle diameter (nm) | Latex stability (min) | Solid coagulation content (wt %) |
| Example 1 | o | 312 | 0.004 | 0.005 | x | 351 | 86 | 0.007 |
| Example 2 | o | 315 | 0.007 | 0.005 | x | 348 | 75 | 0.009 |
| Example 3 | x | 313.7 | 0.01 | 0.012 | o | 349.1 | 60 | 0.014 |
| Example 4 | x | 313.7 | 0.01 | 0.012 | o | 350 | 61 | 0.015 |
| Example 5 | o | 315 | 0.004 | 0.005 | o | 345.2 | 72 | 0.005 |
| Example 6 | o | 315 | 0.004 | 0.005 | o | 353.2 | 67 | 0.007 |
| Example 7 | o | 312 | 0.007 | 0.005 | o | 352.5 | 68 | 0.010 |
| Example 8 | o | 185 | 0.002 | 0.003 | o | 193 | 70 | 0.003 |
| Example 9 | o | 115 | 0.005 | 0.005 | o | 162 | 68 | 0.005 |
| Example 10 | o | 178 | 0.003 | 0.003 | o | 198 | 70 | 0.003 |
| Comparative Example 1 | x | 313.7 | 0.01 | 0.012 | x | 352.7 | 65 | 0.030 |
| Comparative Example 2 | x | 313.7 | 0.01 | 0.012 | x | 353 | 70 | 0.020 |
| Comparative Example 3 | x | 313.7 | 0.01 | 0.012 | x | 351.8 | 61 | 0.030 |
| Comparative Example 4 | x | 117 | 0.02 | 0.15 | x | 157 | 60 | 0.030 |

TABLE 2-continued

| | Conjugated diene-based polymer | | | | Graft copolymer | | | |
| --- | --- | --- | --- | --- | --- | --- | --- | --- |
| Classification | Addition of potassium rosinate A or C | Average particle diameter (nm) | Latex stability (wt %) | Solid coagulation content (wt %) | Addition of potassium rosinate A or C | Average particle diameter (nm) | Latex stability (min) | Solid coagulation content (wt %) |
| Comparative Example 5 | x | 180 | 0.003 | 0.003 | x | 195 | 71 | 0.003 |

Referring to Table 2, it can be confirmed that conjugated diene-based polymers, in which potassium rosinate A or C was added, exhibited significantly lower latex stability and a significantly lower solid coagulation content compared to conjugated diene-based polymers in which potassium rosinate A was not added. Also, it can be confirmed that graft copolymers, in which potassium rosinate A or C was added, exhibited significantly lower latex stability and a significantly lower solid coagulation content compared to graft copolymers in which potassium rosinate A or C was not added.

Meanwhile, it can be confirmed that Comparative Example 5, in which potassium rosinate D having an APHA color value of 65 was added, attained the same level of latex stability as that of Example.

Experimental Example 2

27.5 parts by weight of the graft copolymer of each of Examples and Comparative Examples and 72.5 parts by weight of a matrix copolymer (the trade name "92HR" manufactured by LG Chem Ltd.) were homogeneously mixed to prepare a thermoplastic resin composition. The thermoplastic resin composition was extruded to prepare a pellet. The pellet was injected at 270° C. to prepare an injection sample. The properties of the injection sample were measured by the following methods, and results thereof are shown in the following Table 3.

⑤ Surface glossiness (%): measured at 45° using a gloss meter in accordance with ASTM D528. Higher values indicate excellent surface glossiness.

⑥ Gloss retention: the pellet was introduced into an injector, allowed to stand at 250° C. for 15 minutes, and then injected at 250° C. to prepare a retained sample. In addition, the pellet was introduced into an injector and injected at 200° C. without performing a retention process to prepare a non-retained sample. The surface gloss of the retained sample and the non-retained sample were measured by the method described in ⑤, and a deviation therebetween was measured. Lower values indicate excellent gloss retention.

⑦ L, a, b values of retained sample: L, a, b values of the retained sample prepared by the method described in ⑥ were measured using a Suga Color Computer.

⑧ Residence discoloration (ΔE): L, a, b values of the retained sample and the non-retained sample, which were prepared by the method described in ⑥, were measured using a Suga Color Computer, and residence discoloration values were calculated by the following formula. In this case, lower measured values indicate excellent residence discoloration.

$$\Delta E = \sqrt{(L'-L)^2 + (a'-a)^2 + (b'-b)^2}$$

⑨ Light discoloration: the injection sample was exposed to light having a wavelength of 300 to 800 nm for 400 hours using a Suntest XLS+ (the trade name; manufactured by Atlas) device to prepare an exposed sample. L, a, b values of the injection sample and the exposed sample were measured using a Suga Color Computer, and light discoloration values were calculated by the formula described in ⑧. In this case, lower measured values indicate excellent light discoloration.

⑩ Surface clarity (reflection haze): measured using 512 diodes which are arrayed in a straight line and profile light reflected in a large circular arc of 14 to 27° using an Rhopoint IQ (the trade name; manufactured by Rhopoint Instruments) device, and calculated at an angle of 20° by the following specular formula. In this case, lower measured values indicate excellent surface clarity.

$$Haze = 100 \times \frac{\Sigma Pixels\ from\ 17°\ to\ 19°\ (sample) + \Sigma Pixels\ from\ 21°\ to\ 23°\ (sample)}{Speccular\ Gloss(Standard)}$$

TABLE 3

| Classification | Surface glossiness | Gloss retention | Residence discoloration | Light discoloration | Surface clarity |
| --- | --- | --- | --- | --- | --- |
| Example 1 | 96.0 | 3.0 | 2.0 | 5.4 | 2.4 |
| Example 2 | 96.6 | 2.3 | 1.7 | 4.6 | 2.4 |
| Example 3 | 95.3 | 4.0 | 2.6 | 6.3 | 2.9 |
| Example 4 | 95.6 | 4.1 | 2.7 | 6.5 | 3.1 |
| Example 5 | 96.3 | 2.0 | 1.5 | 4.0 | 1.6 |
| Example 6 | 96.6 | 2.6 | 1.8 | 4.6 | 1.8 |
| Example 7 | 96.0 | 2.8 | 1.9 | 5.2 | 2.5 |
| Example 8 | 115 | 1.7 | 1.4 | 3.7 | 1.0 |
| Example 9 | 110 | 1.9 | 1.7 | 4.0 | 1.2 |
| Example 10 | 114 | 1.7 | 1.5 | 3.8 | 1.0 |
| Comparative Example 1 | 94.8 | 5.8 | 3.0 | 8.72 | 3.4 |
| Comparative Example 2 | 95.7 | 6.2 | 3.3 | 8.9 | 4.0 |
| Comparative Example 3 | 94.8 | 5.8 | 3.0 | 8.72 | 3.5 |
| Comparative Example 4 | 97.8 | 5.9 | 3.5 | 9.0 | 2.8 |
| Comparative Example 5 | 113 | 1.8 | 2.8 | 6.9 | 1.1 |

Referring to Table 3, Examples 1 to 10 were excellent in terms of gloss retention, residence discoloration, light discoloration, and surface clarity. In particular, Examples 5 to 10 were significantly excellent in gloss retention, residence discoloration, light discoloration, and surface clarity compared to Examples 1 to 4 and Comparative Examples 1 to 4. Also, it can be confirmed that Examples 1 and 2 were excellent in gloss retention, residence discoloration, light discoloration, and surface clarity compared to Examples 3 and 4.

Based on these results, it can be confirmed that when potassium rosinate having an APHA color value of 50 or less was added in both the preparation of a conjugated diene-based polymer and the preparation of a graft copolymer, properties were significantly improved. Also, it can be confirmed that when potassium rosinate having an APHA color value of 50 or less was added in the preparation of a conjugated diene-based polymer, properties were significantly improved compared to when it was added in the preparation of a graft copolymer.

Meanwhile, it can be confirmed that although exhibiting excellent gloss retention and surface clarity, Comparative Example 5 exhibited significantly lower residence discoloration and light discoloration. In particular, when Comparative Example 5 was compared with Examples 8 and 10, a difference in these properties was more remarkable.

The invention claimed is:

1. A method of preparing a graft copolymer comprising:
   1) polymerizing a conjugated diene-based monomer to prepare a conjugated diene-based polymer; and
   2) polymerizing the conjugated diene-based polymer, an aromatic vinyl monomer, and a vinyl cyan monomer to prepare a graft copolymer,
   wherein at least one of step 1) and 2) comprises adding an emulsifier having an APHA color value of 50 or less and a critical micelle concentration of 1 to 50 g/l.

2. The method of claim 1, wherein the emulsifier is an alkali metal rosinate having an APHA color value of 50 or less.

3. The method of claim 1, wherein the emulsifier is potassium rosinate having an APHA color value of 50 or less.

4. The method of claim 1, wherein the emulsifier is added in step 1.

5. The method of claim 1, wherein the emulsifier is added in an amount of 0.1 to 5 parts by weight with respect to 100 parts by weight of the conjugated diene-based monomer in step 1).

6. The method of claim 1, wherein all of the emulsifier is added before the initiation of polymerization in step 1).

7. The method of claim 1, wherein, in step 1), a first portion of the emulsifier is added when a polymerization conversion rate is in an interval of 30 to 40%, and a second portion of the emulsifier is added when the polymerization conversion rate is in an interval of 60 to 70%.

8. The method of claim 1, wherein, in step 1), a first portion of the emulsifier is added when a polymerization conversion rate is in an interval of 30 to 40%, a second portion of the emulsifier is added when the polymerization conversion rate is in an interval of 45 to 55%, and a third portion of the emulsifier is added when the polymerization conversion rate is in an interval of 60 to 70%.

9. The method of claim 1, wherein, in step 1), a first portion of the emulsifier is added before the initiation of polymerization, a second portion of the emulsifier is added when a polymerization conversion rate is in an interval of 30 to 40%, a third portion of the emulsifier is added when the polymerization conversion rate is in an interval of 45 to 55%, and a fourth portion of the emulsifier is added when the polymerization conversion rate is in an interval of 60 to 70%.

10. The method of claim 1, wherein the emulsifier is added in step 2).

11. The method of claim 1, wherein the emulsifier is added in step 2) in an amount of 0.01 to 2.5 parts by weight with respect to 100 parts by weight of a combined amount of the conjugated diene-based polymer, the aromatic vinyl monomer, and the vinyl cyan monomer.

12. The method of claim 1, wherein the emulsifier is added before the initiation of polymerization in step 2).

13. The method of claim 1, wherein the emulsifier is added in step 2) when a polymerization conversion rate is in an interval of 30 to 40%.

14. The method of claim 1, wherein the conjugated diene-based polymer has an average particle diameter of 50 to 200 nm.

15. The method of claim 1, wherein the conjugated diene-based polymer has an average particle diameter of 250 to 500 nm.

16. A graft copolymer comprising:
   a conjugated diene-based polymer;
   units derived from an aromatic vinyl monomer;
   units derived from a vinyl cyan monomer; and
   an emulsifier having an APHA color value of 50 or less and a critical micelle concentration of 1 to 50 g/l.

* * * * *